Nov. 23, 1926.
J. F. M. PATITZ
1,607,962
DUPLEX TRACTOR
Original Filed Nov. 3, 1920
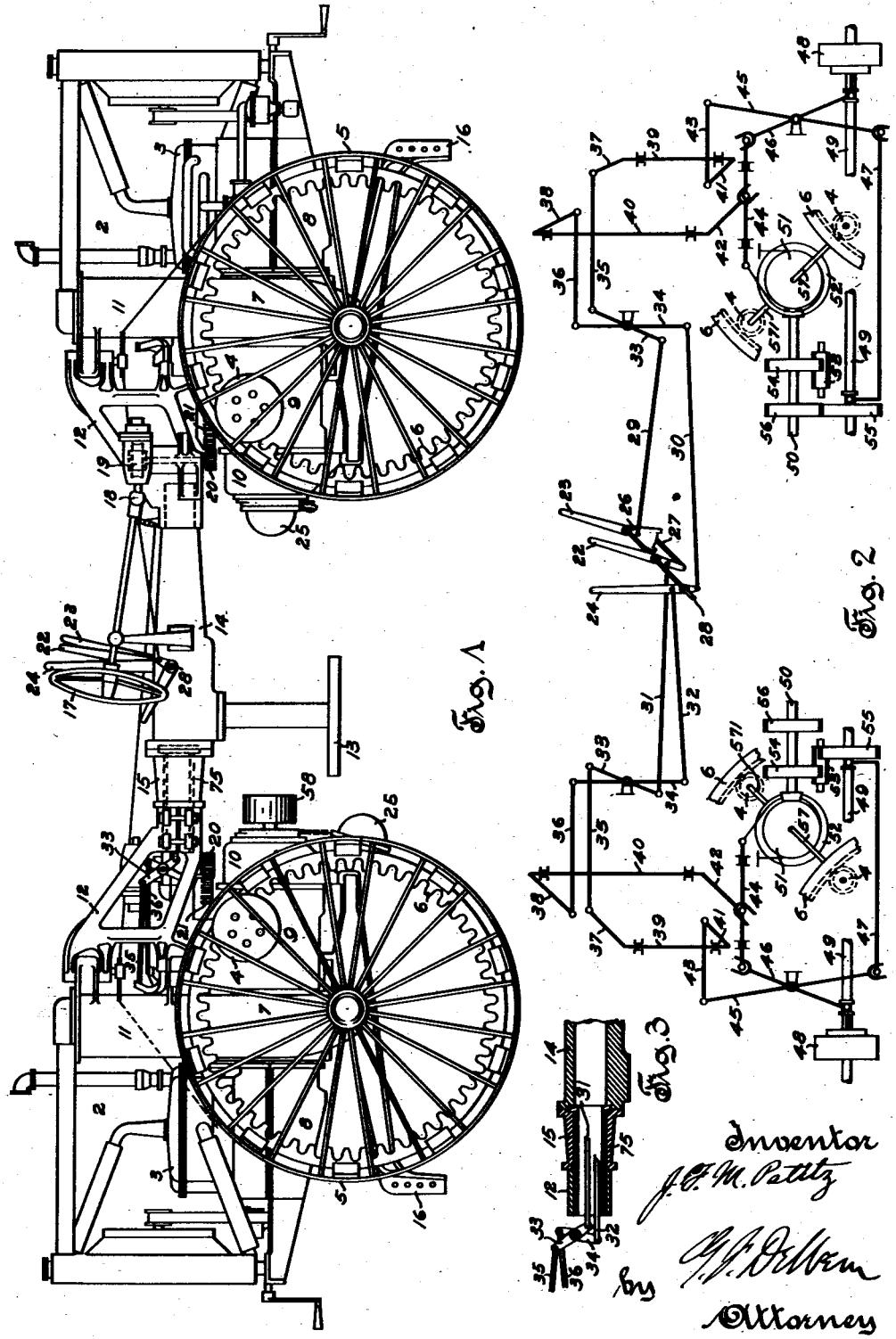

Patented Nov. 23, 1926.

1,607,962

UNITED STATES PATENT OFFICE.

JOHANN FRIEDRICH MAX PATITZ, OF MILWAUKEE, WISCONSIN, ASSIGNOR TO ALLIS-CHALMERS MANUFACTURING COMPANY, OF MILWAUKEE, WISCONSIN, A CORPORATION OF WISCONSIN.

DUPLEX TRACTOR.

Original application filed November 3, 1920, Serial No. 421,431. Divided and this application filed December 6, 1920, Serial No. 428,433. Renewed September 10, 1923.

This invention relates in general to improvements in the art of constructing and of manipulatng traction engines, and relates more specifically to improvements in the construction and operation of farm tractors of the two-wheel type, and to means for uniting or combining several such tractors so that they may be operated as a single unit.

An object of the invention is to provide a tractor which is simple in construction and efficient in operation. Another object of the invention is to provide an improved method of operating and of manipulating tractors.

Some of the more specific objects of the present invention are as follows:

To provide means for permitting an element associated with the reach of a two-wheel tractor to vary its position in accordance with unevenness of the ground surface without affecting the position of the tractor power unit. To provide a tractor which is simple, durable and mechanical in construction and which may be manufactured at minimum cost. To provide a compact tractor, various elements of which are enclosed and protected, the enclosed elements being readily accessible for inspection, adjustment and removal. To provide simple and efficient means for permitting utilization of the motor of one or more tractors to drive stationary machinery. To provide means whereby several farm tractors of the two-wheel type may be associated with each other to produce a vehicle having a four-wheel drive. To provide simple and efficient means manipulable from a central point, for controlling the propelling motors of several indepenednt tractors. To provide connecting means for uniting several tractors whereby their combined power may be utilized to pull trailing implements. To provide a connection between several tractors whereby they will operate in unison but which will permit variations in the position of one tractor in accordance with unevenness of the ground surface, without affecting the position of an associated tractor. To provide means whereby each of several tractors may be operated as a unit independently of the others to perform certain classes of work, and whereby the tractors may be combined to form a single unit for performing other classes of work. To provide other improved details of tractor construction which will reduce to a minimum the cost of manufacture and which will increase to a maximum the efficiency of operation.

This application is a division of application for patent, Serial No. 421,431 filed November 3, 1920. Some of the other novel features herein shown and described, form the subject of Letters Patent No. 1,419,113, granted June 6, 1922.

A clear conception of an embodiment of the invention and of the manner of manipulating tractors constructed in accordance therewith, may be had by referring to the drawings accompanying and forming a part of this specification, in which like reference characters designate the same or similar parts in the various views.

Fig. 1 is a side elevation of a duplex farm tractor.

Fig. 2 is a diagrammatic perspective view of part of the manipulating and controlling mechanism of a duplex tractor.

Fig. 3 is an enlarged fragmentary longitudinal vertical section through the horizontal swivel connection between the several tractors constituting a duplex tractor.

Each of the individual tractor units 2 comprising the duplex tractor disclosed in the drawings, consists generally of a motor 3, transmission mechanism located at one end of the motor and enclosed within a housing or casing 9, supporting and propelling wheels 5 located on opposite sides of the motor 3, gearing operatively connecting the transmission mechanism with the propelling wheels, and a laterally swingable element or yoke 12 vertically pivotally connected with the frame of the power unit and constituting part of the means for attaching the units to each other.

The motors 3 are illustrated as being of the vertical internal combustion type but may be of any other desired type. Each of the motors 3 is provided with a lower crank casing 8 rigidly attached to one end of an intermediate frame 7 the opposite end of which is rigidly attached to a transmission housing 9. The transmission housing 9 is provided with a detachable casing portion or cap 10 the end of which is provided with a removable cover 25. The motor crank casing 8, the intermediate frame 7, the transmission housing 9, and the cap 10 form the frame structure of each power unit 2. The lower portion of the intermediate frame 7 is provided with a pair of laterally projecting stub axles which form supports for the wheels 5, while the upper portion of this intermediate frame 7 is provided with a fuel supply tank 11 formed in one with the intermediate frame 7 and having laterally extending parallel vertically spaced lugs to which the yoke element 12 is pivotally connected. The construction of each unit and the relative locations of the motor and transmission elements thereof, is such that the weight of the motor and of the associated parts on one side of the vertical plane of the axles, substantially balances the weight of the transmission housing, of the transmission mechanism and of the elements associated therewith on the other side of this plane. Each of the units 2 may be provided with a suitable draw bar 16 attached to the cap 10 and to the intermediate frame 7 thereof, as for alternate right and left plows.

The pivotal centers of the laterally swingable elements or yokes 12 are preferably located out of the vertical plane of the wheel axes of the units. The swingable elements 12 are preferably formed bifurcated and with alined vertically spaced bearings at the ends of the bifurcations, in order to reduce to a minimum the weight without sacrificing strength and length of bearing. The bifurcation of the elements 12 also permits utilization of the space between the vertical bearings, for location of controlling elements or other parts. The yokes 12 of the several tractors are joined by means of a tubular connecting beam member 14 clamped within the hub of and thereby rigidly attached to one of the yokes, a swivel casing 15 rigidly attached to the end of the beam member 14, and as shown in Fig. 3, a swivel sleeve 75 clamped within the hub of and thereby rigidly attached to the other yoke 12 and located within the casing 15. This horizontal pivotal connection between the yokes 12 permits a swiveling motion of one of the units relative to the other about the longitudinal axis of the connecting member. The tubular connecting beam member 14 besides serving as a connection between the several tractor units, serves as a support for the operator's platform 13 and for the controlling and manipulating elements of the units, and as a housing for part of the control connections.

The yoke 12 of each of the power units 2 is normally prevented from swinging about its vertical pivot by means of a segment rack 21 secured to the transmission housing 9, and a coacting spur pinion 20 associated and swingable with the yoke 12. The pinion 20 is secured to the lower end of a vertical shaft carried by the yoke, to the upper end of which a worm wheel 19 is secured. A steering worm coacting with the worm wheel 19 serves as a lock for normally preventing rotation of the pinion 20 relative to its rack 21. A steering rod 18 mounted upon the tubular connecting member 14 coacts with one of the steering worms, and has a steering hand wheel 17 associated therewith in proximity to the operator's platform 13. The yoke 12 of the unit 2 having its pinion 20 thus associated with a steering hand wheel 17, may be swung about its vertical pivot by manipulation of the hand wheel 17.

In each of the power units 2, the driving motor 3 has its main crank shaft connected to one element of a main clutch 48, another element of which clutch is associated with an end of a horizontal main transmission shaft 49, see Fig. 2. The main transmission shaft 49 extends longitudinally of the tractor and is mounted in suitable bearings within the transmission housing 9 and cap 10. An axially movable transmission gear 55 is splined upon the shaft 49, this gear 55 being slidable along the shaft 49 by means of a rod 47. During forward propulsion of either of the units 2, the gear 55 meshes with a gear 56 mounted upon a countershaft 50 located above and extending parallel to the main transmission shaft 49, as shown to the right in Fig. 2. During reverse propulsion of either of the units 2, the gear 55 meshes with an idler gear 53 which in turn meshes with a gear 54 secured to the counter-shaft 50, as illustrated to the left in Fig. 2. The spacing of the gears 53, 54, 56 longitudinally of a unit 2, is such that the shiftable gear 55 upon being moved from one extreme position to the other, first passes through a neutral position wherein it does not mesh with either of the gears 53, 56. The transmission gears 53, 54, 55, 56 are all mounted within the transmission casing 9 and cap 10, and the end of the main transmission shaft 49 is preferably extended to within the removable cover 25 in order either to permit attachment of a driving pulley 58 and utilization of the motor 3 to drive machinery other than the unit itself, or to permit utilization of the motors of both units to drive a single machine or element other than the traction wheels 5.

The inner end of each counter-shaft 50 is provided with a pinion which meshes with the driving gear of a differential 52 associated with the half-shafts 57, 571. The outer end of each of the half-shafts 57, 571, is provided with a driving pinion 4 which meshes with an internal gear 6 secured to the adjacent drive wheel 5. The casing of the differential 52 is provided with a band-brake 51 which is preferably operable simultaneously with, but reversely of the main clutch 48 by means of a horizontally movable connection 44 and a connecting lever 46. The lever 46 has a medial stationary pivot and has its lower extremity associated with the movable member of the main clutch 48. The connection 44 is mounted in horizontal bearings and has its opposite ends secured respectively to the brake 51 and to the upper extremity of the lever 46, the medial portion of the connection 44 being associated with the swingable end of a horizontal rocker arm 42. The horizontal rocker arm 42 is secured to the lower extremity of the vertical shaft 40 to the upper extremity of which is secured a horizontally swingable rocker arm 38. The arms 42, 38 extend in the same general direction with reference to the rock shaft 40. The outer end of the upper rocker arm 38 is connected to the upper extremity of the lever 34 by means of a generally horizontally movable connecting rod 36. The lower extremity of the lever 34 of one (the left as shown in Fig. 2) of the power units 2 is connected to the clutch and brake actuating lever 24 at a point above the horizontal pivot 28 thereof by means of the connecting rod 32. The lower extremity of the lever 34 of the other (the right as shown in Fig. 2) power unit 2 is connected to the actuating lever 24 at a point below the horizontal pivot 28 thereof by means of a connecting rod 30. These connecting rods 30, 32 are located within the tubular member 14 and the swivel casing 15, and in close proximity to the axis of the horizontal pivotal connection afforded by the sleeve 75. With this combination of clutch and brake operating lever and connecting rods, movement of the lever 24 to the right from the neutral or central position, will throw the clutches 48 of both power units 2 out of engagement and the band-brakes 51 into action. Movement of the lever 24 to the left will throw the clutches 48 into and the band-brakes 51 out of action.

The shiftable gear 55 of each propelling unit is movable along the corresponding main transmission shaft 49 by means of the horizontal rod 47 having an end thereof connected to the lower extremity of the lever 45. The medial portion of this lever 45 has a stationary fulcrum while the upper extremity thereof is connected to the end of a horizontally swingable rocker arm 41 by means of a horizontally movable connecting rod 43. The rocker arm 41 is secured to the lower extremity of a vertical rock shaft 39 to the upper extremity of which is secured a horizontally swingable rocker arm 37. The arms 37, 41 extend away from the rock shaft 39 in the same general direction, the rock shaft 39 being parallel to the rock shaft 40. The outer extremity of the upper rocker arm 37 is connected to the upper extremity of the lever 33 by means of a substantially horizontally movable connecting rod 35. The lever 33 of one (the left as shown in Fig. 2) of the power units 2 has its lower extremity connected by means of a connecting rod 31, to a gear shift actuating lever 22 having a laterally extending transverse pin 27 rigidly associated therewith. The lower extremity of the lever 33 of the other (the right as shown in Fig. 2) power unit 2 is connected by means of a connecting rod 29, to the gear shift lever 23 having a lost motion segment 26 associated therewith. The segment 26 has end projections or abutments spaced and straddling pin 27 so that with both of the levers 22, 23 in neutral position, either of the levers may be moved to one or the other of its extreme positions without affecting the position of the other lever. These projections however prevent simultaneous shifting of the gears of both power units 2 in the opposite sense, as will be later explained. The connections 29, 31 are also located within the tubular member 14 and the swivel casing 15, and in close proximity to the axis of the horizontal pivotal connection afforded by the sleeve 75, while the common pivot 28 of the levers 22, 23, 24 is mounted in the sides of the tubular member 14.

In order to permit utilization of the motor 3 of either of the power units to drive a stationary machine of any kind, the rear cap 25 of the unit may be removed so as to expose the extremity of the main transmission shaft 49. A driving pulley 58 may then be applied directly to the end of the transmission shaft 49 and the power transmitted therefrom by means of belt. During such utilization of the motive power, the shiftable gear 55 of its corresponding power unit should be thrown into neutral position.

During normal forward propulsion of the duplex tractor formed by uniting the two power units 2, the motors 3 are operating to drive their respective crank shafts which are acting to drive the main transmission shafts 49 through the clutches 48. The shiftable gear 55 of the rear power unit 2 is positioned as shown at the left in Fig. 2 and is co-operating with the reversing (referred to that power unit) gears 53, 54 and through the differential 52, half shafts 57, 571, and pinions 4 to drive the wheels of this tractor in a clock-wise direction as viewed in Fig. 1. The shiftable gear 55 of the forward propelling unit 2 is in mesh with the forward driving gear 56 of this tractor as shown to the right of Fig. 2 and is acting through the differential 52, half shafts 57, 571, and pinions 4, to drive the wheels of this tractor also in a clock-wise direction as viewed in Fig. 1. During such normal forward propulsion, gear shift levers 22, 23 of both tractors have been thrown to the right from neutral position as shown in Fig. 2 and the clutch operating lever 24 has been thrown to the right and has been permitted to return to neutral position.

For reverse propulsion of the duplex tractor, the levers 22, 23 are both thrown in the reverse directions or to the left from neutral and from the position illustrated in Fig. 2. The clutch operating lever 24 however remains as shown after having been brought to neutral or from braking position. With the levers 22, 23 thrown into reverse position, the shiftable gear 55 of the forward power unit 2, is co-operating with the reversing gear 53 of that unit, and the shiftable gear 55 of the rear power unit 2 is in mesh with the forward (referred to that power unit) driving gear 56. The gear shift levers 22, 23 of the respective power units must be thrown individually to either extreme position. If one of these levers 22, 23 is in right or left position, the other may readily be thrown into the same position. If, however, one of these levers 22, 23 is in right or left position and it is attempted to throw the other lever into the opposite position, the shifted lever will be automatically brought to mid position before the gears manipulated by the other lever can be shifted. This result is brought about by the projections on the segment 26 co-operating with the transverse pin 27 of the lever 22.

The duplex tractor may be readily controlled to steer the same by manipulation of the hand wheel 17 which causes the frame of the forward power unit 2 to swing relatively to the beam member comprising the tubular members 14 and 15 and the connected yoke 12, about the vertical pivot. Such relative swinging is effected by virtue of the pinion 20 meshing with the segmental rack 21. The worm wheel 19 however provides a lock-geared connection between the beam member 14 and the propelling unit from which it will be noted that swinging of the forward power unit on the beam member may only be effected by manipulation of the steering wheel 17, unless the worms are connected as hereinabove described.

If during operation of the duplex tractor, one of the tractor units 2 engages a surface which tends to cause transverse tilting thereof relatively to the other unit, such relative tilting of the units is freely permitted by the horizontal pivotal connection between one of the yokes 12 and the beam member 14, specifically shown in Fig. 3. This horizontal pivotal connection is of sufficient strength to permit transmission of the entire draft of either of the units 2 therethrough. During the relative lateral tilting of the units 2, the manipulating rods 29, 30, 31, 32, passing through and in close proximity to the axis of the horizontal pivotal connection, are subjected to a slight twisting action which is however accommodated by the looseness in the joints between the ends of the rods and the elements associated therewith.

It will be noted that the construction of the tractor units is substantially the same and that by removing the tubular beam member 14, the swivel casing 15 and swivel sleeve 75, both of the units may be supplied with beam members and supporting means therefor and controlling devices such as are disclosed in Letters Patent No. 1,419,113, granted June 6, 1922, thereby permitting utilization of the units as independent tractors. The individual units may thus be utilized for the performance of relatively light work such as cultivating etc., whereas by combining the two units into a duplex tractor, it is possible to perform more strenuous work such as heavy plowing. By so combining the tractors into a duplex tractor, it has been found that the resulting four-wheel drive machine will readily pull three plows under conditions where the individual tractors are able to pull only one plow each. In case one of the differentially connected wheels of one of the units slips in soft ground for instance, the machine will nevertheless be able to proceed because the tractive effort will continue in the remaining unit.

It should be understood that it is not desired to limit the invention to the exact details of construction herein shown and described for various modifications within the scope of the appended claims may occur to persons skilled in the art.

It is claimed and desired to secure by Letters Patent:

1. A duplex tractor comprising two units each having a driving motor, a beam member supported by and connecting said units, and means common to both of said motors for controlling the same, said means being mounted upon said beam member between said motors.

2. A duplex tractor comprising two units each having a driving motor, a beam member connecting said units, means common to both of said motors for controlling the same, said means being mounted upon said beam member, and connection between said units including a vertical pivot.

3. A duplex tractor comprising two units each having a driving motor, a beam member connecting said units, means common to both of said units for controlling said motors, said means being mounted upon said beam member, and a connection between said units including a horizontal pivot.

4. A duplex tractor comprising two units each having a driving motor, a beam member connecting said units, means common to both of said units for controlling said motors, said means being mounted upon said beam member, and a vertical pivotal connection between each of said units and said beam member.

5. A duplex tractor comprising two units each having a driving motor, a beam member connecting said units, means common to both of said units for controlling said motors, said means being mounted upon said beam member, a connection between said units including a vertical pivot, and a connection between said units including a horizontal pivot.

6. A duplex tractor comprising two units each having a driving motor, a tubular beam member connecting said units, means common to both of said units for controlling said motors, said means being mounted upon said beam member, and connections between said means and said motors located within said beam member.

7. A duplex tractor comprising two units each having a driving motor, a yoke element vertically pivotally connected to each of said units, and a beam member connecting said yoke elements and supported entirely by said units.

8. A duplex tractor comprising two units each having a driving motor, a yoke element vertically pivotally connected to each of said units, a beam member connecting said yoke elements, and a horizontal pivotal connection between said beam member and at least one of said yoke elements.

9. A duplex tractor comprising two units each having a driving motor, a yoke element vertically pivotally connected to each of said units, a beam member connecting said yoke elements, and a horizontal pivotal connection between said units located in axial alinement with said beam member.

10. A duplex tractor comprising two power units each having a pair of wheels located on opposite sides of the unit and a motor having its center of gravity located to one side of the vertical plane of the axis of said wheels, a yoke element vertically pivotally connected to each of said units, the connection of each of said yoke elements to its unit being on the opposite side of said vertical plane of said unit, and a beam member connecting said yoke elements.

11. A duplex tractor comprising two units each having a driving motor, a tubular beam member connecting said units, means for controlling said motors, said means being mounted upon said beam member, and connections between said means and said motors located within said beam member.

12. A duplex tractor comprising two units each having a complete power plant, a beam member connecting said units, a vertical pivotal connection between one of said units and said beam member, and a horizontal pivotal connection between one of said units and said beam member.

13. A duplex tractor comprising two units each having a driving motor, a beam member connecting said units, a horizontal pivotal connection between said beam member and one of said units, and steering means associated with the other of said units and mounted upon said beam member.

14. A duplex tractor comprising two units each having a driving motor, a yoke element vertically pivotally connected to each of said units, a beam member rigidly secured to one of said yoke elements and horizontally pivotally connected to the other of said yoke elements, and steering means for producing relative motion between said rigidly connected yoke element and its unit about its vertical pivotal connection.

15. A tractor having four traction wheels and two motors arranged to operate all four of said wheels simultaneously, said tractor being readily separable into two smaller tractors or sections each with two traction wheels and one of the motors, and an attachment for each tractor section to keep it in horizontal position when detached from the other section of the tractor.

16. A tractor comprising four traction wheels and two motors, each motor being arranged to drive two of said wheels and both motors being adapted to operate simultaneously, said tractor being readily separable into two sections each having two traction wheels and one of said motors, and an attachment for each section to keep the same from tilting fore and aft when detached from the other section of the tractor.

17. A duplex tractor comprising two units, each having a driving motor and forward and reversing transmission gearing associated with said motor, independently operable means for controlling the setting of said forward and reversing transmission gearing on each of said units, and means associated with one of said setting means for positively preventing setting of said other setting means to produce opposite driving of said units.

18. A duplex tractor comprising two units, each having a driving motor and forward and reversing transmission gearing associated with said motor, a manually operable lever for controlling said forward and reversing transmission gearing of one of said units, a manually operable lever for controlling said forward and reversing transmission gearing of the other of said units, and means associated with one of said levers for preventing setting of the other of said levers to produce opposite driving of said units.

19. A duplex tractor comprising two units each having a complete power plant, a beam member connecting said units, and means common to both of said motors for controlling the same, said means being mounted upon said beam member.

In testimony whereof, the signature of the inventor is affixed hereto.

JOHANN FRIEDRICH MAX PATITZ.